Nov. 16, 1926.
T. G. LEONARDI
1,607,402
TOY VEHICLE
Filed Dec. 22, 1925    2 Sheets-Sheet 1
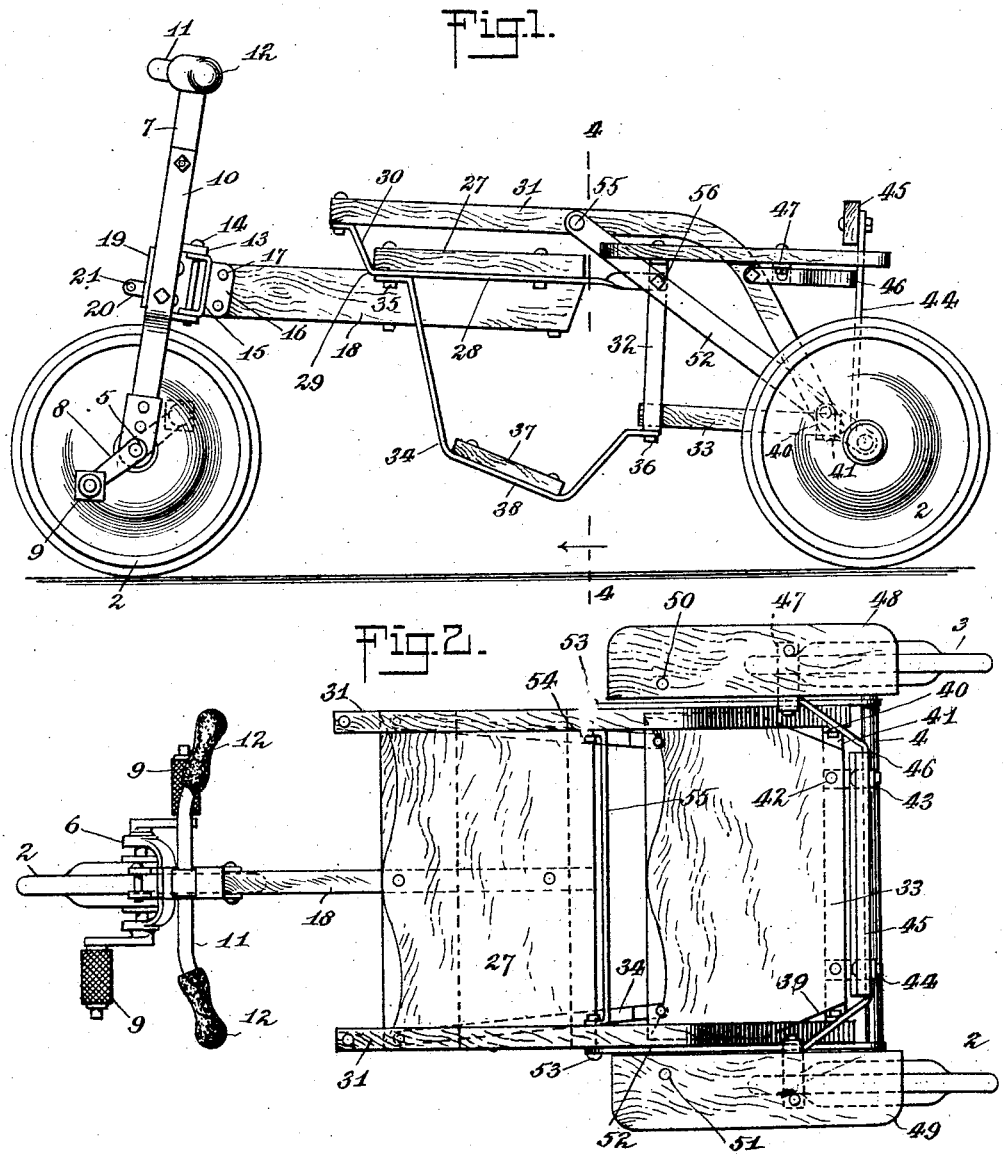
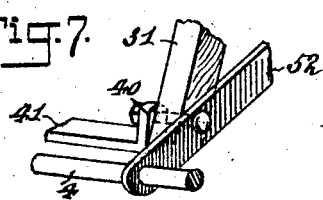
WITNESSES
INVENTOR
Thomas G. Leonardi
BY
ATTORNEYS Nov. 16, 1926. 1,607,402
T. G. LEONARDI
TOY VEHICLE
Filed Dec. 22, 1925 2 Sheets-Sheet 2
Fig.3.
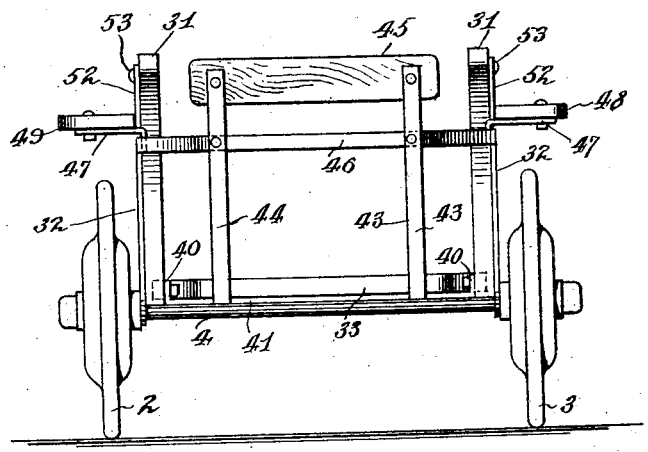
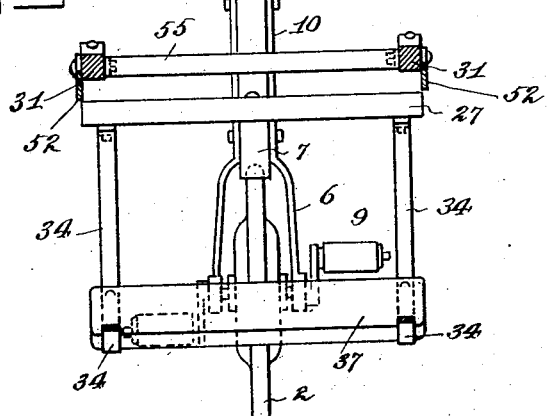
Fig.4.
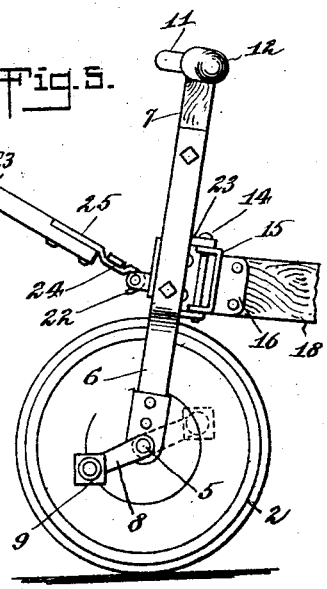
Fig.5.
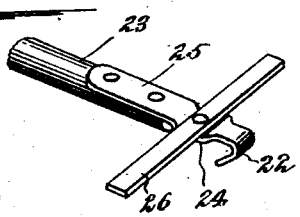
Fig.6.
WITNESSES
William P. Goebel.
A. L. Kitchin.
INVENTOR
Thomas G. Leonardi
BY
ATTORNEYS Patented Nov. 16, 1926.

1,607,402

UNITED STATES PATENT OFFICE.

THOMAS GAETANO LEONARDI, OF BROOKLYN, NEW YORK.

TOY VEHICLE.

Application filed December 22, 1925. Serial No. 76,997.

This invention relates to toy vehicles and has for an object to provide an improved construction wherein accommodation is provided for several children.

Another object of the invention is to provide a toy wheel vehicle which may be propelled by one of the occupants, the arrangement being such that means are provided for supporting a child for propelling the vehicle and for supporting another child as a passenger.

A further object of the invention is to provide a wheel vehicle wherein one or more children may be transported, the arrangement being such that one of the children may propel the vehicle or a person walking may pull the vehicle and steer the same at the same time.

In the accompanying drawings—

Figure 1 is a side view of a toy vehicle, disclosing an embodiment of the invention.

Figure 2 is a top plan view of the structure shown in Figure 1.

Figure 3 is a rear view of the structure shown in Figure 1 with the steering mechanism eliminated.

Figure 4 is a sectional view through Figure 1 on line 4—4.

Figure 5 is a side view similar to the left hand part of the showing in Figure 1 with a tongue or handle shown connected thereto.

Figure 6 is an enlarged detail fragmentary perspective view of one end of the tongue or handle shown in Figure 5.

Figure 7 is a detail fragmentary perspective view of part of the rear axle and rear bracing and supporting members.

Referring to the accompanying drawings by numerals, 1 indicates a front wheel and 2 and 3 indicate rear wheels. The rear wheels 2 and 3 are rotatably mounted on the shaft 4 while the front wheel 2 is secured to an axle 5 in any desired manner, which axle in turn is rotatably mounted in the yoke 6 to which the bar or upright 7 is secured. Adjacent the extreme outer ends of the axle 5 are secured cranks 8 carrying suitable pedals 9 whereby the wheel 2 may be rotated for propelling the vehicle. The yoke 6 is made preferably from a pair of metallic members, each member having an upwardly extending section 10 bolted or otherwise rigidly secured to the upright 7. The upright 7 has a handle bar 11 connected therewith in any desired manner, said handle bar in turn being provided with a pair of grips 12. Arranged slightly above the wheel 2 is a U-shaped bracket 13 having an aperture in each of the legs of the U-shaped structure for accommodating the removable pin 14. The pin 14 extends through part of the U-shaped bracket or fitting 15, which bracket or fitting is provided with flanges 16 through which rivets or bolts 17 extend, said rivets or bolts in turn extending through a central bar 18. Connected to the front part of the uprights 7 is a plate 19 having ears 20 which carry a rod 21. This rod is adapted to receive the hook 22 of the tongue or handle 23 (Figures 5 and 6). The hook 22 is provided with a depressed portion 24 and an extension 25 riveted or otherwise secured to the handle 23. A foot rest 26 is riveted or otherwise secured in the depression 24 so that when the handle or tongue 23 is in operation, the person sitting on the seat may rest his or her feet on the foot rest 26 while another person pulls the vehicle. The hook 22 is an open hook and, consequently, the tongue 23 may be applied and removed at any time but when in position it is partly around the rod 21 and between the ears 20 whereby the front wheel may be steered.

The bar 18 is bolted or otherwise rigidly secured to the center of the seat 27, which seat is also bolted or otherwise rigidly secured to a piece of strap iron 28 bent at 29 so that the upper end of section 30 may be bolted or otherwise secured to a side supporting beam 31. The end of the supporting strap 28 opposite section 30 is twisted and clamped to a vertical section 32 by a suitable bolt. The section 32 extends downwardly from the strap 28 on one side of the vehicle beneath the front part of the rear seat 33 and up on the opposite side where it is connected to the other strap 28, there being an identical arrangement of straps 28 on opposite sides of the vehicle. On each side of the vehicle there is a foot supporting strap 34 bolted or otherwise secured at 35 to the strap 28 and seat 27 while the opposite end is bolted or otherwise secured at 36 to the lower part of section 32 and to seat 33. A foot receiving support or board 37 is riveted or otherwise secured to the inclined section 38 of strap 34 as shown particularly in Figure 1. At the rear of the seat 33, the parts are chamfered or beveled off at 39 and the upstanding ends 40 of the strap 41 are arranged adjacent these inclined portions while the strap 41 extends across the under surface of the rear part of the seat to which it is riveted or bolted by suitable members 42. The bolts or rivets 42 also support vertical braces 43 and 44 which have the lower ends bent under the strap or bar 41. The upper part of the bracing members 43 and 44 have secured thereto a back board or piece 45 and also a bracing metallic strap 46. The ends of the strap 46 are bent toward the front as shown in Figure 6 and are bolted or riveted to the beams 31. An angle bracket 47 is riveted or otherwise secured to the forwardly extending sections of strap 46 and also bolted or otherwise secured to the respective mud guards or arm supports 48 and 49. The forward ends of these mud guards or supports are supported by the respective sections 32 which are bolted or otherwise secured thereto at 50 and 51. A diagonal supporting brace 52 is arranged on each side of the vehicle and at one end is bolted or otherwise secured to the beam 31 by a bolt or rivet 53 which also extends through the turned over end 54 of the bracing strap 55. The opposite end of the bracing beam 52 is provided with an aperture for accommodating the rear axle 4, said rear axle extending through the apertures in the respective beams 52. A bolt 56 is provided in each of the beams 52 and extends therethrough through one end of the respective sections 32 and also through one end of the respective straps 28 whereby all these members are connected together at this point and the parts are consequently braced.

In operation, when the parts are as shown in Figures 1 and 2, one child may sit on the seat 33 and put his feet on the foot rest 37 while a second child may sit on the front seat 27 with his feet on the pedals 9. The second child is in position to propel the vehicle by rotating the wheel 2. He is also in a position to steer the vehicle by properly operating the handle bars 11. It is, of course, evident that the children could reverse the position at any time or if desired, one child could use the vehicle.

Under some circumstances, an adult may wish to pull the vehicle along with one or more children on the vehicle and when this is the case the tongue 23 is used and hook 22 slipped over the rod 21. This will permit the adult to pull the tongue and also move the vehicle in any desired direction. It will thus be seen that the vehicle may be used as a toy for the children during play and as a wagon or carriage for transportation when pulled by an adult or by another child.

What I claim is:

1. A toy vehicle, comprising a body provided with a series of seats, a pair of traction wheels for supporting the rear of the body, a steerable front traction wheel for supporting the front part of the body, means forming a socket operatively associated with the front traction wheel, a handle for pulling and steering the vehicle, said handle being formed with, and a removable tongue formed to interlock with said socket whereby the front traction wheel may be shifted for steering the same.

2. A toy vehicle, comprising a series of traction wheels, means for operating certain of said wheels for steering the vehicle, a body mounted on said wheels, said body being formed with a rear seat near the axle of the rear wheels, a front seat arranged above and near the front of the vehicle, a series of upper and lower bracing members connecting the two seats, means for bracing the lower seat including a pair of arm rests and a foot rest.

3. A toy vehicle, comprising a pair of rear wheels, a single front wheel, means including pedals for rotating the front wheel, a substantially vertically arranged fork and standard operatively associated with the front wheel, a pair of handle bars for shifting said fork and standard for steering the front wheel, a substantially U-shaped bracket carried by said fork and standard, and a body for said vehicle, said body including a beam at the front, a substantially U-shaped bracket extending from the front of the beam and co-acting with the first mentioned bracket, a pin for connecting said brackets together and permitting said fork and standard to swing substantially in a horizontal plane for steering purposes, a seat carried at the rear end of said beam, a seat arranged near the axle of the rear wheels and below the first mentioned seat, a series of braces connecting said rear seat with the rear axle of the vehicle, said braces extending to near the front seat, and means for connecting said braces with the front seat.

4. A toy vehicle, comprising a series of traction wheels, the rear traction wheels being connected by a rear axle, a frame carried by said traction wheels, said front traction wheel being connected with the frame so as to swing and thereby steer the vehicle, said frame including a top bar, a seat connected with the top bar near the rear end of the top bar, a seat arranged adjacent said rear axle and below the first mentioned seat, upper and lower bracing members connecting said seats, and a pair of diagonal bracing members connected with certain of the first mentioned bracing members, with said seat and encircling said rear axle for pivotally mounting the frame on the rear axle.

THOMAS GAETANO LEONARDI.